United States Patent Office 3,497,043
Patented Feb. 24, 1970

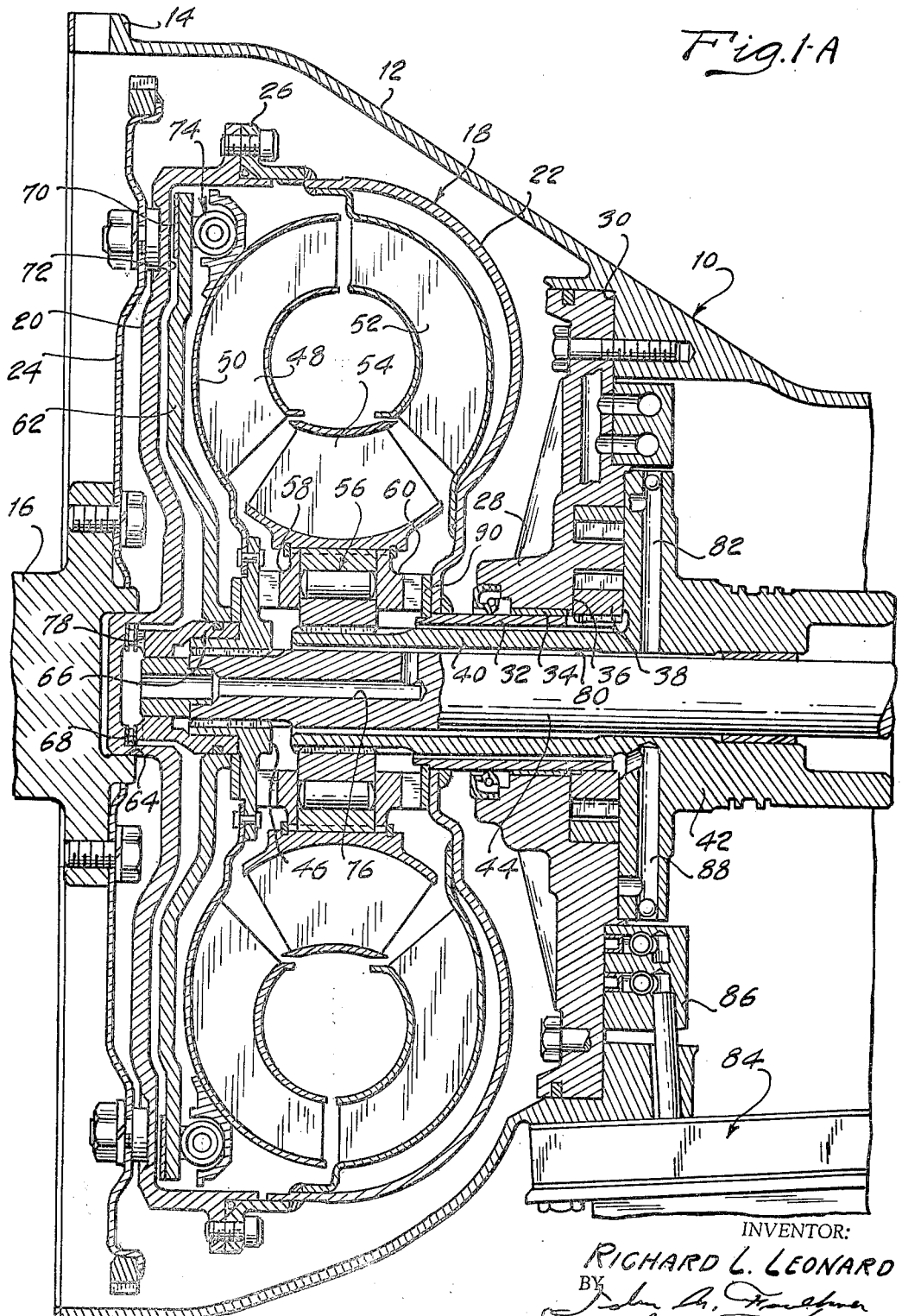
Fig.1-A
INVENTOR:
RICHARD L. LEONARD
ATTORNEYS.

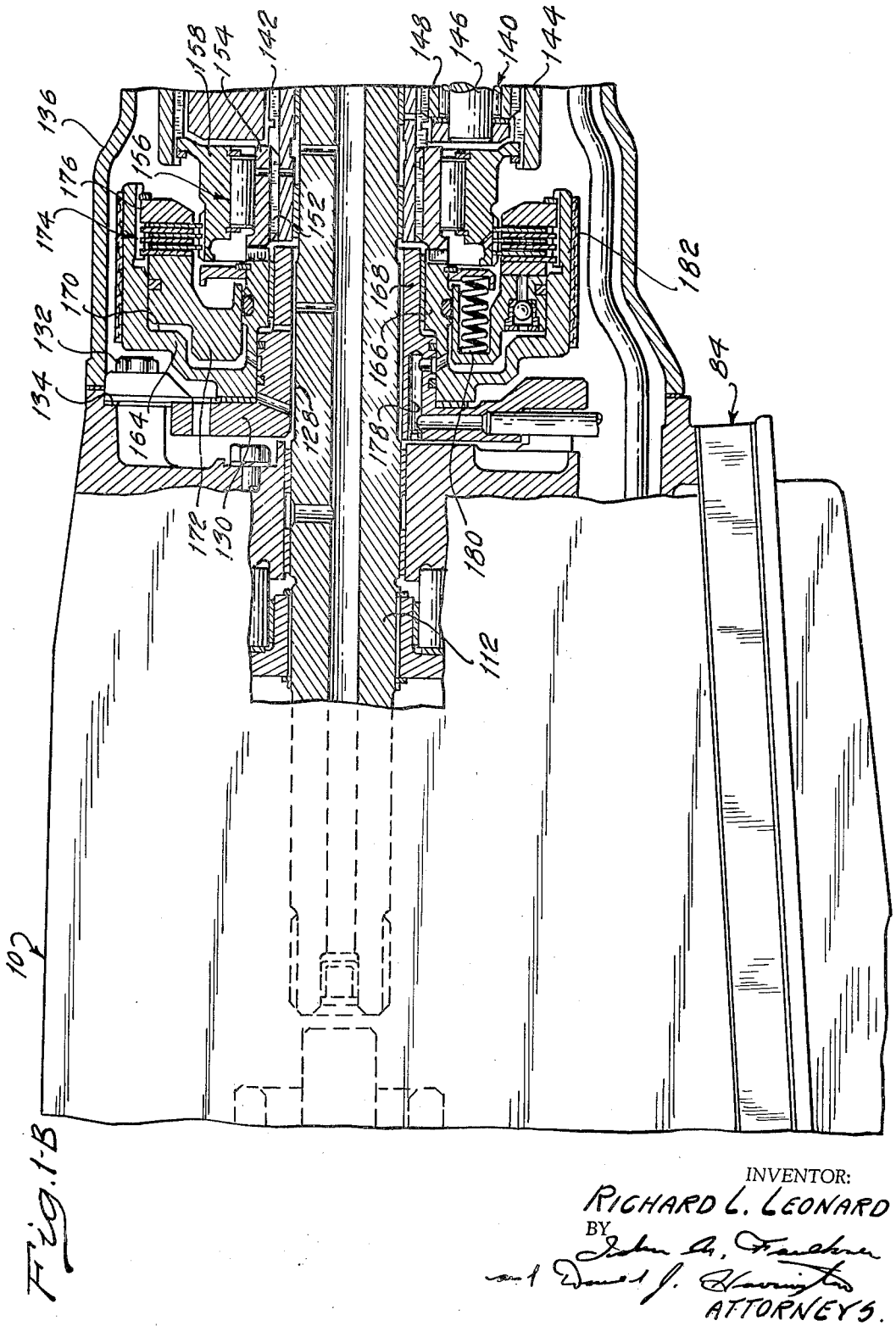

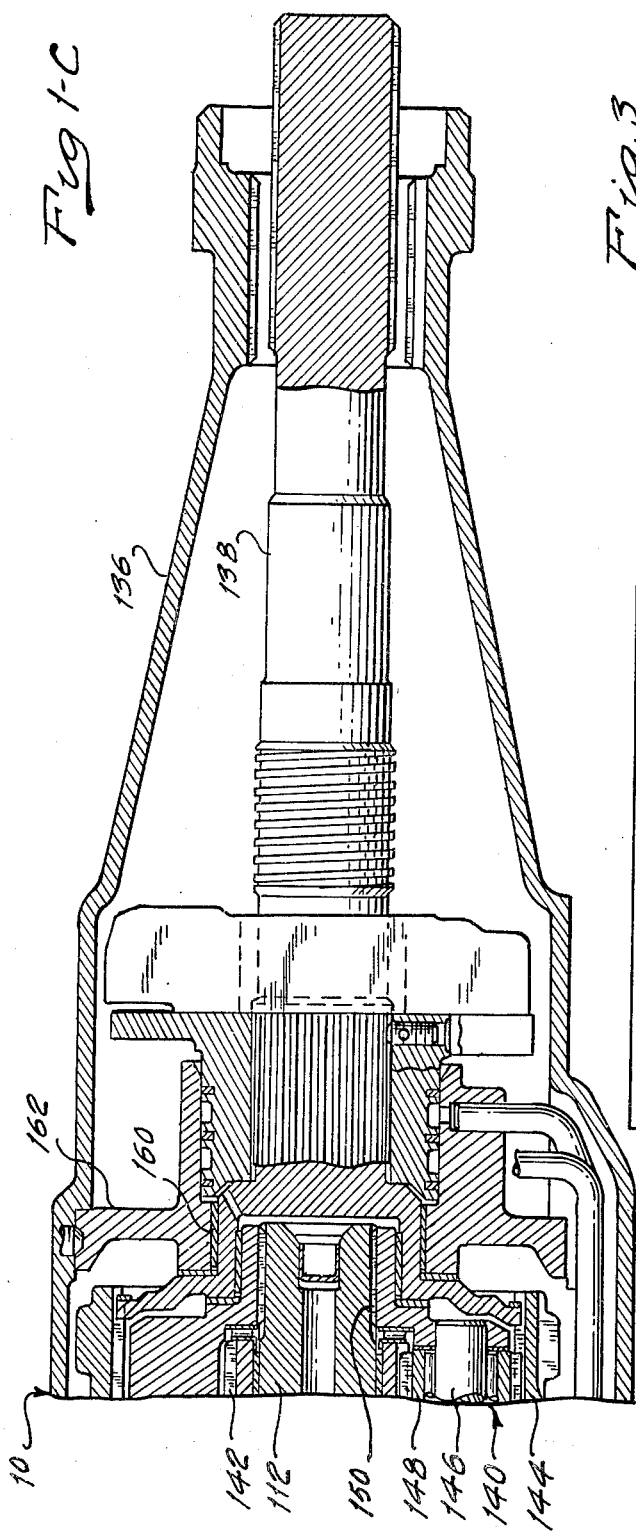

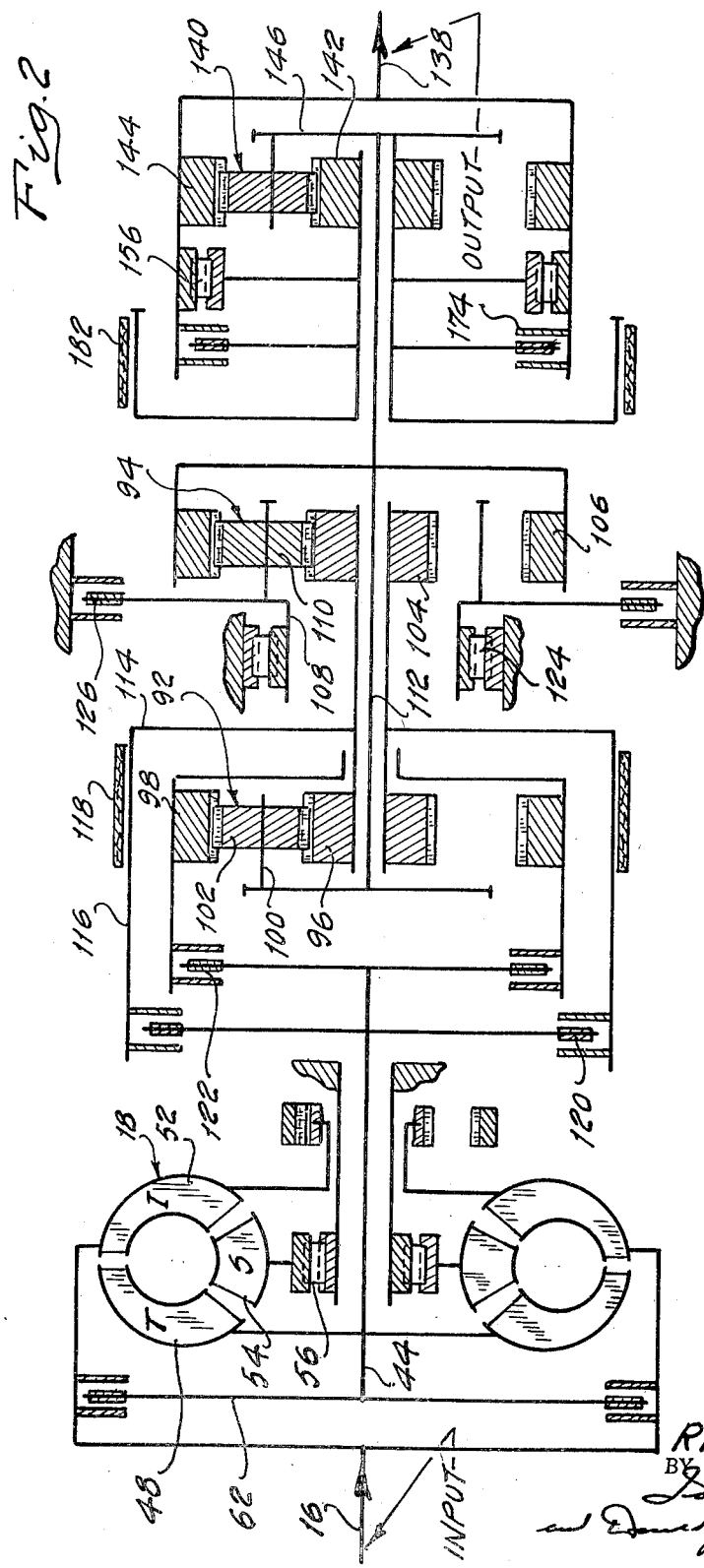

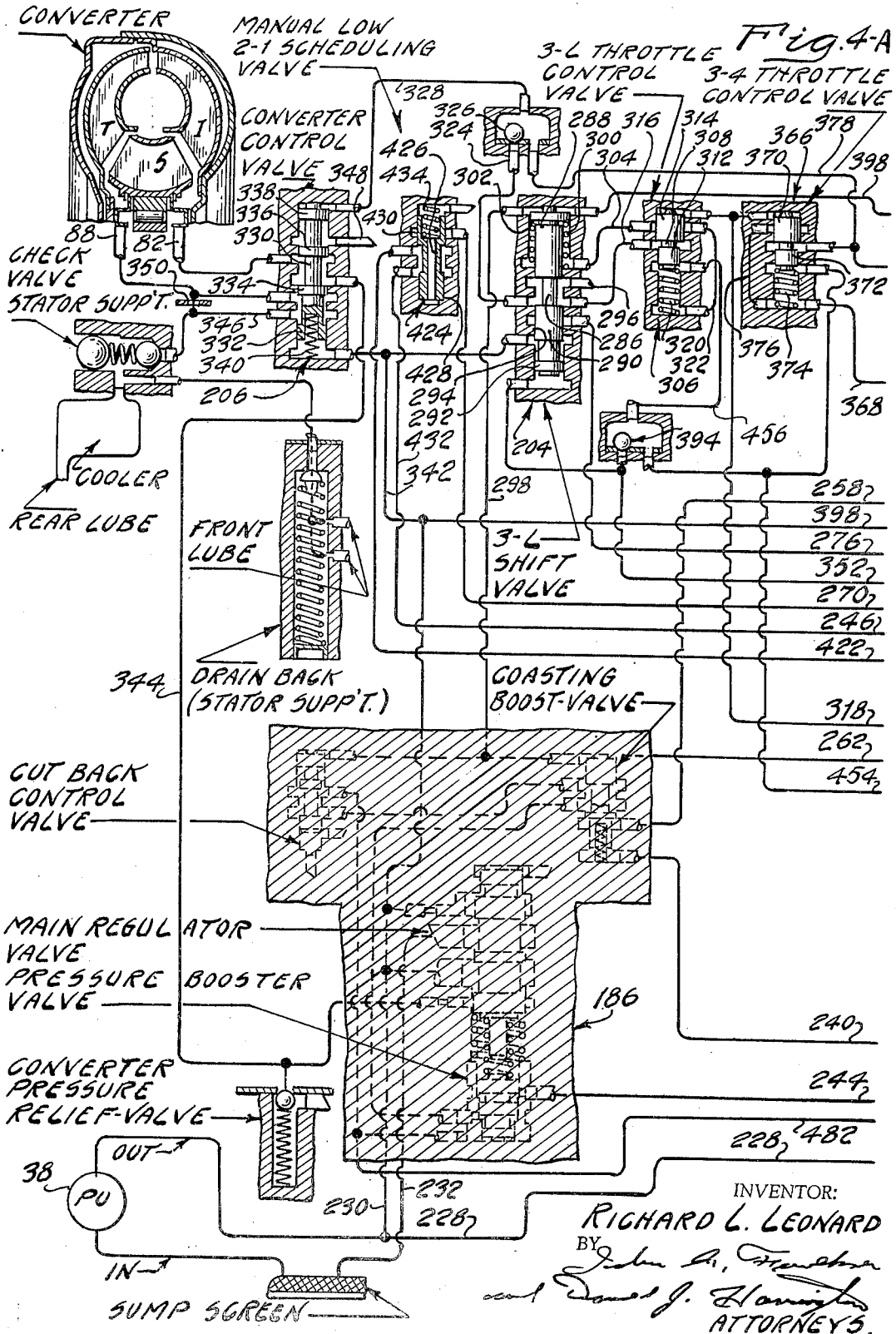
Fig. 4-A

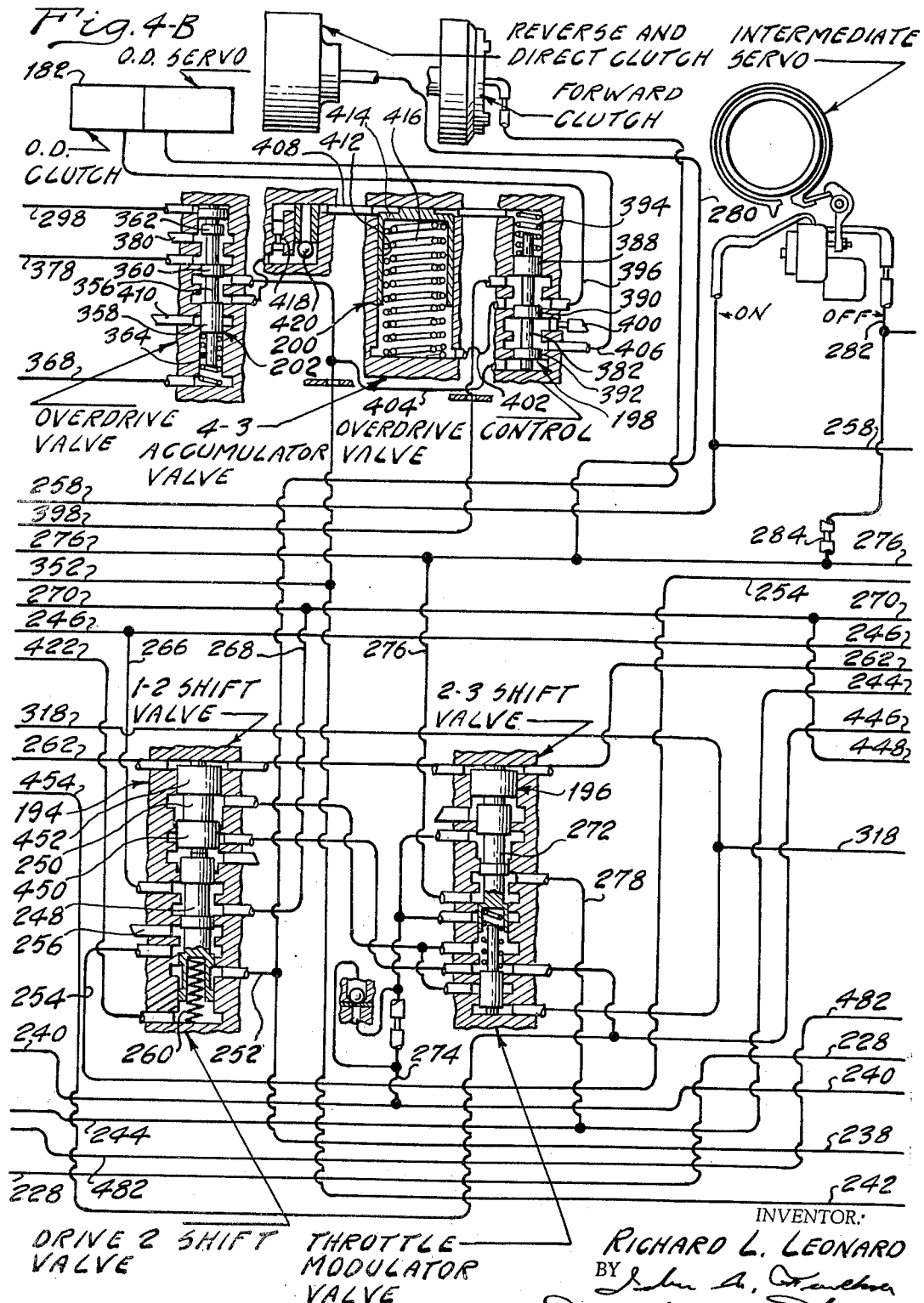

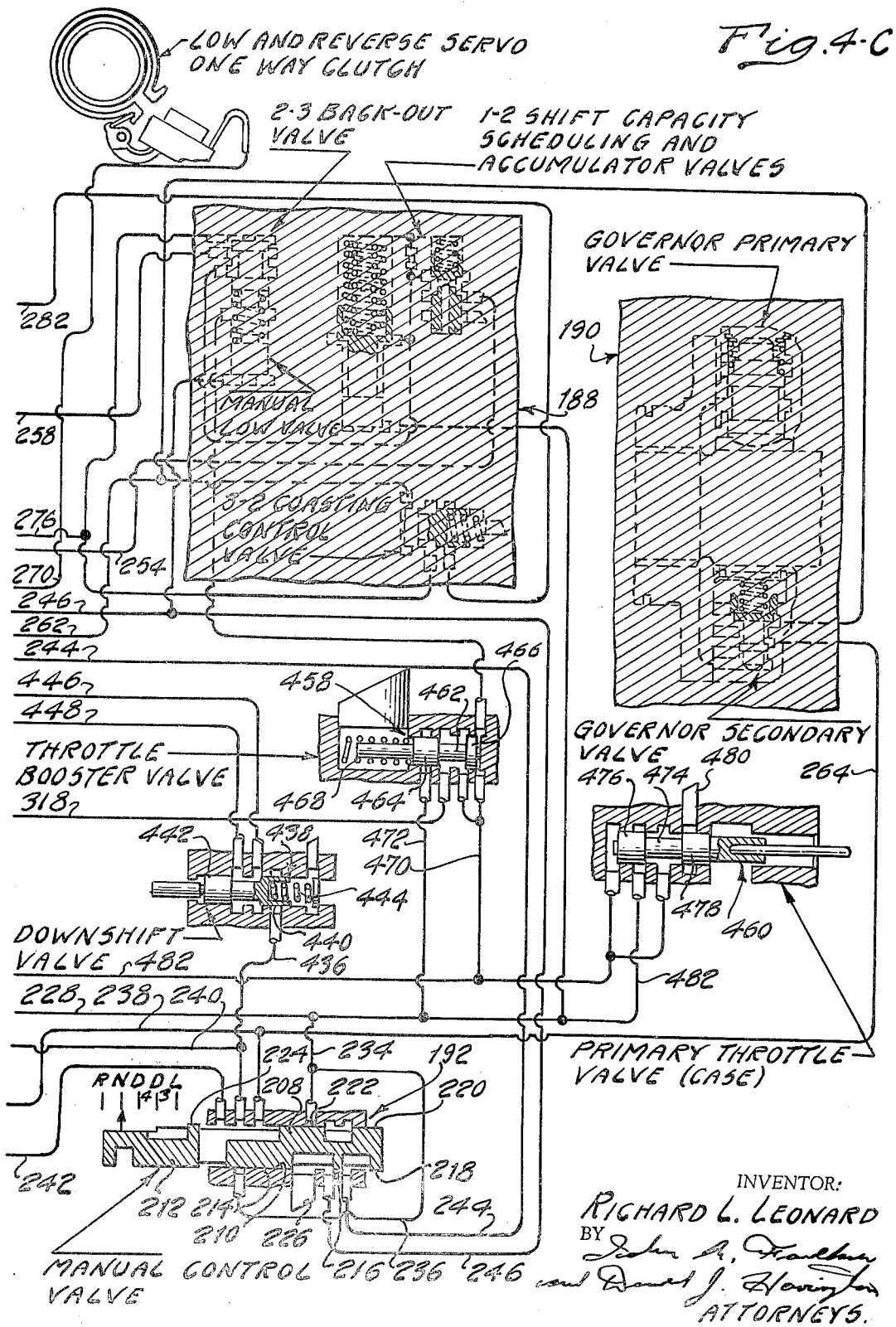

3,497,043
MULTIPLE RATIO GEARING FOR AN
AUTOMOTIVE VEHICLE DRIVELINE
Richard L. Leonard, Farmington, Mich., assignor to Ford
Motor Company, Dearborn, Mich., a corporation of
Delaware
Filed July 25, 1968, Ser. No. 747,601
Int. Cl. B60k 21/06; F16h 5/60, 47/08
U.S. Cl. 192—.052                            13 Claims

ABSTRACT OF THE DISCLOSURE

A planetary transmission having an overdrive gear unit that may be mounted at the power output end of a main planetary gear system, the overdrive gear unit including simple planetary gear elements that can be conditioned for either a direct drive ratio or an overdrive ratio by means of sequentially engageable clutch-and-brake servos.

GENERAL DESCRIPTION OF THE INVENTION

The improvement of my invention is adapted to be used in a planetary power transmission mechanism for use in an automotive vehicle driveline for delivering torque from an engine to a transmission tailshaft. Such a mechanism is disclosed in U.S. Patent No. 3,295,387, which is assigned to the assignee of this invention.

My improved mechanism comprises a hydrokinetic torque converter situated between the engine crankshaft and the power input element of the main planetary gearing. An auxiliary overdrive planetary gear unit is mounted adjacent the power output end of the main planetary gearing to provide selectively an overdrive ratio to complement the multiple ratios that are available in the main planetary gearing. A common control valve system for the overdrive gearing and the main planetary gearing, including fluid pressure operated clutch and brake devices, establish the various driving speed ratios.

A friction lockout clutch, which forms a part of the hydrokinetic torque converter assembly, can be applied after a steady-state, cruising condition is achieved to establish maximum fuel economy. The valve system establishes a calibrated clutch engagement-and-release schedule for the converter lockout clutch.

BRIEF DESCRIPTION OF THE FIGURES OF
THE DRAWINGS

FIGURES 1A, 1B and 1C show in longitudinal cross section the gear of my improved mechanism.

FIGURE 2 is a line diagram of the transmission mechanism of FIGURES 1A, 1B and 1 C.

FIGURE 3 is a chart showing the clutch and brake engagement-and-release pattern for the FIGURES 1A, 1B and 1C mechanism.

FIGURES 4A, 4B and 4C show in diagrammatic form a control valve system for controlling the clutch-and-brake servos of the mechanism of FIGURES 1A, 1B and 1C.

PARTICULAR DESCRIPTION OF THE
INVENTION

In FIGURE 1A, numeral 10 designates the transmission housing, which includes a portion 12 for enclosing a hydrokinetic torque converter 18. Housing portion 12 is bolted to the cylinder block of an internal combustion engine having a crankshaft 16. Flange 14 permits the bolted connection.

The converter 18 has a converter shell comprising shell parts 20 and 22, which are bolted together at their peripheries as shown at 26. A transmission bearing support wall 28 is secured to an internal shoulder 30 formed in the housing 10. It includes a sleeve 32 piloted within a bearing opening 34 in the wall 28.

Wall 28 includes a pump chamber 36 which receives positive displacement gear pump elements 38. A stationary stator support sleeve 40 is formed on the bearing support 42, which is bolted to the wall 28. Turbine shaft 44 is journalled within the sleeve shaft 40. It is splined to the hub 46 of a bladed turbine 48. The outer shroud 50 of the turbine 48 is riveted or otherwise secured to the hub 46.

A bladed impeller assembly 52 is secured within the shell portion 22. It is arranged in fluid flow relationship with respect to the turbine 48. A bladed stator 54 is located between the flow exit section of the turbine 48 and the flow entrance section of the impeller 52. Stator 54 includes a hub that receives an overrunning brake 56, the inner race of which is splined to the stationary sleeve shaft 40. Spacer elements 58 and 60 maintain proper space relationship between the stator and the adjacent hubs on the turbine 48 on the impeller 52.

A pump shown in part at 38 serves as a positive displacement fluid pressure source for the control system to be described subsequently.

Located between the shroud 50 in front of the turbine 48 and the shell part 20 is a lockup clutch piston 62. It is formed with a central opening 64 which receives a pilot 66. This serves as a spacer for the hub 46. Thrust on the turbine 48 is taken by radial needle bearing 68 received in a pilot recess formed in the center of the shell part 20.

The radially outward periphery of the piston 62 is formed with an annular friction surface 70 which is adapted to engage frictionally the friction surface 72 formed on the inside of the shell part 20. Piston 62 can be shifted into engagement with the shell part 20 under the influence of the force of the static pressure inside the torus circuit of the converter 18.

A torsional damper spring assembly 74 establishes a driving connection between the piston 62 and the turbine shroud 50.

A feed passage for the torous circuit is formed in part by a central opening 76 in the shaft 44. This communicates with radial passages 78 formed in the spacer 66. These passages in turn communicate with the annular space between the piston 62 and the shell part 20. Passage 76 communicates with the annular passage 80 defined by the shaft 44 and the surrounding sleeve shaft 40. This communicates in turn with passage 82 which communicates with a valve body assembly 84, part of which is shown at 86.

The annular space between sleeve shaft 32 and stationary sleeve shaft 40 defines another converter fluid passage. This communicates with control pressure passage 88 which also is in fluid communication with the control valve body. Radial passage 90 in the spacer 60 provides communication between the annular space within the shaft 32 and the interior of the torus circuit.

When passage 76 functions as a converter torus feed passage and passage 88 functions as a converter torus flow-return passage, the lockup clutch is disengaged. At that time fluid is fed to the torus circuit radially outwardly across the friction surfaces 70 and 72, which causes the clutch to disengage. When the functions of the passages 76 and 88 are interchanged, however, with the passage 88 supplying fluid to the torus circuit and passage 76 returning it to the inlet side of the control pump, the pressure between the piston 62 and the shell part 20 is relieved. This causes the clutch to become applied, which establishes a mechanical torque delivery path between the crankshaft 16 and the turbine shaft 44.

The gear elements in the driveline comprise two simple planetary gear units 92 and 94. Gear unit 92 comprises sun gear 96, ring gear 98, carrier 100 and planet pinions 102. The pinions 102 are journalled on carrier 100 in meshing engagement with ring gear 90 and sun gear 96.

Gear unit 94 comprises sun gear 104, ring gear 106, carrier 108 and pilot pinions 110. Pinions 110 are journalled on the carrier 108 in meshing engagement with ring gear 106 and sun gear 104.

Power output shaft 112 is connected directly to the carrier 100 and the ring gear 106. Sun gears 96 and 104 are connected drivably together. Drive shell 114 connects sun gears 96 and 104 with brake drum 116 about which is positioned a friction brake band 118. Drum 116 can be connected selectively to turbine shaft 44 through a friction clutch 120. Ring gear 98 can be connected selectively to the turbine shaft 44 through friction clutch 122. Carrier 108 can be anchored to the transmission housing 10 through an overrunning brake 124, which accommodates transfer of torque reaction to the housing in one direction but which permits freewheeling motion of the carrier in a non-braking direction. A friction brake 126 complements the action of the brake 124 to permit distribution of torque reaction from carrier 108 in both directions to the housing.

As seen in FIGURE 2, power output shaft 112 extends through an opening 128 formed in an end wall 130 for the housing 10. This wall is bolted by bolts 132 to shoulder 134 formed on the rear face of the housing 10. The power output shaft 112 is surrounded by a tailshaft extension housing 136. It encloses a transmission tailshaft 138, which may be connected to the power input element of a differential gear assembly through a drive shaft in the usual fashion. Tail shaft extension housing 136 is enlarged to accommodate a planetary gear unit 140 which comprises sun gear 142, ring gear 144, carrier 146 and planetary pinions 148. Pinions 148 are journalled on carrier 146 in meshing engagement with the sun gear 142 and ring gear 144. The carrier 146 is splined at 150 to the power output shaft 112. Sun gear 142 is journalled on the shaft 112. It is splined at 152 to the inner race 154 of an overrunning coupling 156. The outer race 158 for the coupling 156 is connected directly to the ring gear 144. Ring gear 144 is connected also directly to the tailshaft 138, the latter being journalled at 160 on end wall 162 supported by the housing 136.

A clutch-and-brake drum 164 is journalled at its hub 166 on a stationary sleeve shaft extension 168. This is keyed to the inner race 154 for the coupling 156. Drum 164 defines an annular cylinder 170 within which is positioned annular piston 172. The interior of the drum 164 and the outer surface of the outer race 158 carry friction discs which define a multiple disc clutch assembly 174. Reaction ring 176 on one side of the assembly 174 accommodates the thrust portions acting on the assembly 174. Fluid pressure is admitted to the cylinder 170 through the passage 178 which communicates with a valve system. Piston return spring 180 is anchored on the drum hub 166. Hub 166 is keyed or otherwise drivably connected to inner coupling race 154 so that it may rotate with the sun gear 142.

Friction brake band 182 surrounds the drum 164 and is actuated and released by a fluid pressure operated servo not shown. When brake band 182 is applied, sun gear 142 is anchored to the housing 136. Gear unit 140 thus establishes an overdrive ratio therein as ring gear 144 overspeeds the shaft 112.

The brake 182 anchors the sun gear 142 to provide a reaction point for the gear unit 140 during overdrive operation. When brake band 182 is released, coupling 156 connects the sun gear and the ring together for rotation in unison with a 1:1 speed ratio. If torque delivery is desired during coasting operation, for example, the clutch 174 can be applied thereby permitting torque delivery through the gearing with the 1:1 speed ratio in either direction.

The clutch and brake engagement and release pattern is shown in FIGURE 3. Forward drive clutch 122 is engaged during operation in each of the forward drive ratios. The low speed ratio will be established automatically upon engagement of the clutch 122. At that time turbine torque is delivered to shaft 44 and through the clutch 122 to the ring gear 98. A reverse torque is imparted to sun gears 96 and 104 as the carrier 100 offers a resistance to movement of the gear elements. The reverse motion thus imparted to the sun gears 96 and 104 is reversed as the sun gear 104 drives ring gear 106 in a forward driving direction. Carrier 108 acts as a reaction point for the entire system as it is anchored against the housing through overrunning brake 124.

The overdrive gearing 140 may be locked up for rotation with a 1:1 ratio, coupling 156 causing ring gear 144 to be driven by sun gear 142.

If coasting operation is desired while the transmission mechanism is conditioned for the low speed ratio, clutches 174 and 126 can be applied.

To establish a ratio change from the low speed ratio to a high speed ratio, brake 118 is applied thereby anchoring the sun gear 96 so that it may serve as a reaction point. Turbine torque again is delivered through the clutch 122 to the ring gear 98. Overrunning coupling 124 freewheels under these conditions, and gear unit 92 thus serves as the sole torque multiplied. Coasting operation in the intermediate speed ratio merely requires the engagement of clutch 174.

A ratio change from intermediate ratio to the third-speed direct-drive ratio is obtained by disengaging brake band 118 and engaging clutch 120. All of the elements of the gear units 92 and 94 thus rotate in unison. Overrunning coupling 156 locks up the overdrive gear unit 140 as it does during operation in the first speed ratio and in the second speed ratio. Coasting operation under these conditions is established merely by engaging clutch 174.

Overdrive ratio is obtained by retaining the direct-drive third-speed ratio condition for the gear units 92 and 94. Overdrive clutch 174, however, is released and brake 182 is applied. After the brake 182 is fully applied, clutch 62 is applied thereby establishing a direct drive connection between crankshaft 16 and shaft 44, which bypasses the hydrokinetic unit 18.

Reverse drive is obtained by engaging clutch 120 and disengaging clutch 122. Torque reaction is achieved by applying the brake 126. Turbine torque then is delivered directly to the sun gear 104 as carrier 108 acts as a reaction member. Clutch 174 locks up the overdrive planetary gear unit 140 and brake 182 is released.

The control valve system that controls the application and release of the clutch-and-brake servos is illustrated schematically in FIGURES 5 and 6. The main elements of the control system are the pressure regulator valve assembly 186, a shift scheduling and accumulator valve assembly 188, a speed signal governor 190, a manual selector valve assembly 192 and two shift valve assemblies 194 and 196. These elements control the main planetary gear units 92 and 94. In addition to these, however, the principal elements of the circuit include also an overdrive control valve 198, an accumulator 200, an overdrive shift valve 202, a second shift valve 204 for controlling the ratio shifts between the direct drive ratio and the overdrive ratio and a converter control vale 206.

These latter elements, in addition to controlling the ratio changes between the overdrive ratio and the third-speed drive ratio, control also the engagement of the overdrive clutch following application of the overdrive brake. The regulator valve system 186, the scheduling and shift control valve system 188 and the governor valve system 190 have been described in U.S. Patent No. 3,309,939, and will not be repeated here. Reference may be had to that patent, however, for the purpose of supplementing this disclosure.

Manual control valve 192 includes movable valve element 208 which is generally cylindrical in form. It is, slidably received in the valve chamber 210. Valve element 208 has two series of valve lands that are displaced 180° with respect to each other. One series comprises lands 212, 214, 216 and 218. The other series comprises lands 220, 222 and 224. The space between lands 222 and 224 is in fluid communication with the space between lands 212 and 214. The two ends of the chamber 210 form exhaust ports. Another exhaust port is formed in the chamber 210 at 226.

The line pressure for the valve system is supplied by the pump shown in part at 38 through control pressure passage 228. This passage communicates with the main regulator valve system 186 through passage 230. The low pressure side of the valve system 186 communicates with the inlet side of the pump through passage 232. The pressure maintained in the passage 228 by the regulator valve system 186 is of a relatively constant value for any given engine torque in the vehicle speed. Control pressure is distributed to the chamber 210 through passages 234 and 236. These communicate with various pressure distributor passages, one of which is shown at 238. Passage 238 is pressurized whenever the manual valve element 208 is moved to the D-4 position, the D-3 position or the L position. Passage 240 also communicates with the chamber 210 and is pressurized whenever the manual valve assumes a D-4 position or the D-3 position. It is exhausted at other times. Passage 242 also communicates with the chamber 210 and is pressurized only when the manual valve element 208 assumes a D-4 position and is exhausted at other times.

Passage 244 communicates with the chamber 210 adjacent the right-hand end thereof. It is pressurized whenever the manual valve element 208 is shifted to the R position for reverse drive. Passage 246, which is adjacent passage 224, is pressurized whenever the manual valve assumes the L position or the R position.

The various operating positions indicated in FIGURE 4C for the manual valve element are indicated by the reference characters R, N, D-4, D-3 and L. These respectively correspond to reverse drive position, neutral position, the overdrive lockup position, the direct drive position and the low speed ratio position.

Passage 238 extends directly to the fluid pressure operated servo for the clutch 122. Thus, this clutch is applied whenever the mechanism is conditioned for forward drive operation.

The intermediate brake servo for applying and releasing brake band 118 comprises a double-acting piston of the type shown in the aforesaid patent. During an acceleration from a standing start, the upshift from the low speed ratio to the intermediate speed ratio is controlled by the 1-2 shift valve 194. This comprises multiple land valve spools 248 and 250. Control pressure is distributed to the lower end of spool 248 through branch passage 252, which communicates with a forward clutch feed passage 238. Passage 254, when the valve spools 248 and 250 assume the positions shown in FIGURE 5, is exhausted through exhaust port 256 in the shift valve 194. Passage 254 in turn comunicates with the intermediate servo feed passage 258 through the scheduling and control valve system 188. Valve spring 260 normally urges the valve spools 248 and 250 in the upward direction as viewed in FIGURE 5. The force of the spring 260 is opposed by a governor pressure signal force acting on the upper end of spool 250.

Governor pressure is distributed to the valve 194 through governor pressure passage 262. The signal in passage 262 is developed by the governor valve assembly 190 which is connected drivably to tailshaft 138. Governor valve assembly 190 is fed with control pressure through passage 264 which is connected directly to the passage 238 so that a pressure signal is available whenever the transmission system is operating in a forward drive ratio.

When the shift valve elements 248 and 250 are urged in a downward direction under the influence of the governor pressure in passage 262, passage 252 is brought into communication with passage 254 as communication between passage 254 and exhaust port 256 is interrupted. The transmission mechanism is conditioned for intermediate speed ratio operation as valve spool 248 moves in a downward direction.

If the manual control valve element 208 is moved initially to the L position while the vehicle is at rest, the low servo will become applied as pressure is distributed through passage 246 to passage 266, through the 1-2 shift valve chamber and through passage 268. This latter passage extends to the low-and-reverse brake servo feed passage 270. Ratio changes between the third-speed ratio and the second-speed ratio are controlled by the 2-3 shift valve 196. This includes a multiple land valve spool 272 which controls distribution of pressure from the 2-3 shift valve feed passage 274 to passage 276. It also establishes a connection between passage 278 and passage 276 when the manual valve is shifted to the R position. Passage 278 in turn communiactes with passage 244, which is pressurized in reverse drive but which is exhausted at other times. Passage 276 extends to the feed passage 280 for the reverse-and-direct clutch. It extends also to the third-and-overdrive shift valve 204.

As passage 276 is brought into communication with passage 274 through the 2-3 shift valve, passage 280 becomes pressurized and passage 282 extending to the release side of the intermediate servo also becomes pressurized, passage 282 being connected to passage 276 through orifice 284. When both sides of the intermediate brake servo become pressurized, the servo becomes released. With the direct drive clutch 120 applied and the servo for brake 118 released, the transmission is conditioned for direct-drive operation.

At this time the third-to-overdrive shift valve 204 is conditioned for a subsequent upshift to the overdrive ratio as pressure is fed to it through passage 276. This valve includes shiftable valve element 286 having three spaced valve lands 288, 290 and 292 situated slidably within valve chamber 294. Internal valve lands are formed in chamber 294 which register with the external valve lands of the valve element 286. An exhaust port 296 is situated adjacent one end 288.

The upper end of the valve element 286 is pressurized with governor pressure which is distributed to the valve 204 through governor pressure passage 298. Valve spring 300 normally maintains the valve element 286 in the upward position. An annular area 302 is formed on the upper end of the valve element 286 and this area is subjected to modulated throttle valve pressure which is distributed to it through passage 304. The modulated throttle valve pressure is developed by throttle control valve 306. This includes valve spool 308 having two valve lands 314 and 312, the diameter of the former being greater than the diameter of the latter. The differential area defined by the valve lands is in communication with the valve chamber 294 through passage 316. Throttle valve pressure is distributed to the upper end of the land 314 through throttle pressure passage 318. Valve spring 320 opposes the force of the throttle pressure acting on land 314.

Feedback pressure passage 322 connects the upper end of the valve chamber for the valve 306 with the chamber for the spring 320. Valve element 308 thus is effective to modulate the pressure in passage 318 to produce a reduced modulated pressure in passage 304 which is distributed to the shift valve element 286 thereby delaying the point at which an upshift occurs. When the upshift does occur, passage 316 is brought into communication with pressurized passage 276. Thus, the modulating characteristics of the valve 306 are changed. In this way the effect of the shift delay caused by the effective pressure in passage 304 is different for automatic shifts from the lock-up condition to third-speed ratio than it is for the automatic upshift from third-speed ratio to the lock-up condition.

When the throttle pressure forces and the governor pressure forces are effective to cause an upshift of the shift valve 204, pressure is distributed directly from passage 276 to passage 324. It then passes through a two-way check valve 326 to passage 328 extending to the valve 206.

Valve 206 comprises a valve spool 330 which is formed with four spaced valve lands 332, 334, 336 and 338. Spring 340 urges the valve spool 330 in an upward direction. The spring force supplements the force of the line pressure acting on the lower end of land 332 which is distributed to the lower end of the valve chamber for valve 206 through passage 342.

Passage 342 is a continuation of passage 230 which is in direct communication with the discharge side of the pump 38.

Valve 206 serves to reverse the direction of flow through the torus circuit. In this way the lockup clutch is controlled. When the valve 206 is in the position shown in FIGURE 5, passage 82, which is one of the feed passages for the torus circuit, is in communication with passage 344 which extends from the main regulator valve assembly 186, the latter supplying fluid to the passage 344 at a regulated pressure level. Passage 88 acts as a flow return passage for the torus circuit. It communicates with the lubrication oil circuit through a passage 346 through the valve chamber for valve 206.

When the valve 206 is shifted to the lock-up condition, the valve element 330 moves downwardly. This establishes a connection between passage 82 and exhaust port 348. It establishes also a connection between feed passage 344 and passage 88 thus reversing the direction of flow through the circuit. The converter now becomes locked-up, as explained previously. In order to maintain the continuous supply of fluid to the lubrication oil circuit, one passage of which is shown at 346, a flow restricting orifice 350 connects the passage 88 to the passage 346, thereby maintaining lubrication while the converter is in the locked-up condition.

The automatic shift from the third-speed ratio to the lock-up ratio can be achieved only after the 2–3 upshift has occurred since the passage 276 is pressurized only after the shift valve 196 is moved to the upshift position.

At this time the manual valve is in the D–3 position. Thus passage 242 is exhausted through the manual valve. This passage serves to feed the 3–4 shift valve 202. That valve thus is inactive when the manual valve is in the D–3 position. If we assume now that the manual valve is moved to the D–4 position, it is possible to obtain an automatic 3–4 upshift from the high speed direct-drive ratio to the overdrive ratio. At this time the direct-to-lock-up shift valve 204 is rendered inactive. This is accomplished by distributing control pressure from pressurized passage 242, through passage 352 and through two-way vent valve 354 to the lower end of the land 292. This maintains the valve element 286 in the upward position thereby preventing shifting movement to the upshift position for valve 204.

The overdrive shift valve 202 includes a valve element 356 having three spaced valve lands 358, 360 and 362. Governor pressure acts on the upper end of land 362. Governor pressure is distributed to valve 202 through the aforementioned passage 298. Valve spring 364 urges the valve element 356 in an upward direction. Control pressure is distributed to the valve chamber for valve 202 through passage 242. Throttle control valve modulates the pressure in passage 318 and distributes it to the modulated pressure passage 368, which communicates with the lower end of the valve chamber for valve 202 thereby supplementing the force of the spring 364 to delay automatic upshifts.

Valve 366 comprises a valve land 370 and a smaller diameter valve land 372. Throttle pressure in passage 318 communicates with the upper end of land 370. Valve spring 374 opposes the force of the throttle pressure acting on the land 370. Feedback pressure passage 376 distributes a feedback pressure to the spring chamber for valve 366. The output pressure in passage 368 is a modulated control pressure that is distributed to the lower end of the valve element 356. When an upshift occurs for the valve 202, communication between passage 378 and exhaust port 380 is interrupted. Passage 378 is subjected to control pressure whenever the shift valve 204 moves to the upshift position since it communicates directly with the passage 324 through check valve 326.

Thus when the valve 202 upshifts, the differential area defined by lands 370 and 372 is pressurized with the pressure in passage 378. This establishes a shift delay that is different during an automatic downshift than the shift delay that occurs during an automatic upshift.

When the manual valve is shifted to the D–4 position, passage 242 distributes pressure to the lower end of the valve 198. This valve comprises a valve spool 382 having three valve lands 388, 390 and 392. Valve spring 394 normally urges the valve element 382 in a downward direction. When it is in this position, the overdrive clutch servo feed passage 396 is brought into communication with line pressure feed passage 398. This passage in turn receives regulated line pressure from passage 342. Communication between passage 396 and exhaust port 400 in the valve chamber for valve 198 is interrupted. Line pressure feed passage 398 is in communication also with accumulator passage 402 through valve 198 when valve element 382 is in the downward position. This passage 402 is brought into communication with exhaust port 400, however, when the valve element 382 is shifted in an upward direction. This occurs whenever passage 404 is pressurized. Fluid pressure is distributed to passage 404 through passage 242 whenever the manual valve is in the D–4 position. At other times, however, it is exhausted.

Movement of the valve in the upward direction as passage 242 is pressurized results in communication between passage 404 and passage 406, which extends to the overdrive brake servo. If the chamber for the spring 394 is pressurized, however, valve element 382 will assume a downward position notwithstanding the presence of pressure in passage 404. Thus, the overdrive brake servo is exhausted as exhaust port 400 is brought into communication with passage 406. Engagement and release of the overdrive clutch and the overdrive servo then is accomplished by selectively exhausting and pressurizing the chamber for spring 394. This is done by controlling pressure distribution to passage 408 with which the upper end of the valve element 382 communicates. The distribution of pressure to the valve 198 is controlled by the overdrive shift valve 202.

When the manual valve is in the D–4 position, and if the 3–4 shift valve is in the third-speed ratio position shown in FIGURE 4C, pressure distribution takes place through the valve 202 between passage 242 and passage 408. Thus, the overdrive clutch will be applied because at that time valve element 382 will be in the downward position so that communication takes place between passage 398 and overdrive clutch feed passage 396.

If the overdrive shift valve 202 moves to the upshift position under the influence of the increased governor pressure in passage 298, passage 408 will be exhausted through exhaust port 410 in the valve 202. The valve element 382 then will be urged upwardly under the influence of the line pressure acting on the land 392. This will exhaust passage 396 through exhaust port 400 and passage 406 will be brought into communication with pressurized passage 404 thereby causing the overdrive brake to become applied.

Passage 402 also becomes exhausted through port 400 when the valve element 382 moves in an upward direction. This passage communicates with the lower end of accumulator chamber 412 within which is positioned an accumulator piston 414. This piston is urged in an upward direction by accumulator spring 416. The upper end of the piston 414 and the accumulator chamber 412 define an accumulator cavity that is in communication with passage 408. Thus, when the valve element 382 moves in an upward direction, the accumulator piston 414 becomes conditioned for a subsequent 4–3 downshift condition. When a 4–3 downshift occurs, the previously exhausted passage 408 becomes pressurized as the valve element 356 moves in an upward direction.

Passage 408 feeds pressure to the accumulator cavity thereby tending to stroke the piston 414 as pressure builds up on the upper side of the land 388 for the valve element 382. This action of the accumulator 200 will cushion the application of the overdrive clutch 396 as a downshift occurs from the over-drive ratio to the direct-drive ratio. The pressure distribution from passage 242 to the upper end of the accumulator is metered through orifice 418, but the piston 414 may be returned to the position shown in FIGURE 6 quickly because of the presence of a one-way flow bypass check valve 420 in passage 408.

When the manual valve is shifted to the D–4 position, the land 292 at the lower end of the third-to-lock-up shift valve 204 is pressurizer thereby rendering this valve inactive and preventing an automatic high-to-lock-up shift. The 3–4 shift valve 202 moves to the upshift position, passage 242 is brought into communication with passage 378. At the same time, however, passage 242 continues to communicate with the lower land 392 on the overdrive control valve 198. Thus, the valve element 382 will begin to stroke immediately following the upshifting movement of the valve element 356. The stroke of the valve element 382 will take place and will be completed before a pressure buildup will be allowed to occur in passage 378. Passage 378, in turn, communicates with passage 328 through the valve 326. Thus, a pressure signal is not distributed to the upper end of the land 338 until the valve element 382 has been fully stroked to the overdrive position. This arrangement assures that the overdrive brake servo will become fully applied before the lock-up clutch will become applied. Until a pressure buildup occurs in passage 328 and until the force of spring 340 is overcome, the converter clutch will assume the unlocked condition as the valve element 330 continues to assume the upward position shown in FIGURE 5.

Passage 246, as explained earlier, is pressurized when the manual valve is shifted to either the low or the reverse positions. If the operator shifts the valve to the low ratio position when the vehicle is traveling at a speed greater than a predetermined value, the transmission immediately will assume an intermediate speed ratio position, but a downshift position will not occur until the governor pressure acting on the upper end of the valve element 250 has been reduced. The shift point at which an automatic 2–1 downshift occurs during coasting with the manual valve in the low position is determined by the magnitude of the pressure acting on the lower end of valve element 248. Pressure is distributed to that lower end through passage 422. This signal is obtained by the manual low 2–1 scheduling valve 424, which includes a valve element 426 with a first valve land 428 and a second larger valve land 430. Control pressure is distributed directly to the scheduling valve 424 through passage 432 which communicates with the passage 246. The valve spring 434 opposes the force of the pressure acting on the differential area of lands 428 and 430. The resultant output pressure signal for the valve 424 is distributed to passage 422 with which the valve 424 is in communication.

Whenever the mechanism is conditioned for overdrive operation, the converter lock-up clutch becomes applied after the overdrive condition is fully achieved. Both of these control functions occur in response to movement of the 3–4 shift valve 202 although the lock-up condition occurs after the overdrive servo becomes applied. If the transmission mechanism is shifted to the D–3 position, however, passage 242 is exhausted and the transmission can effect an automatic ratio shift to the lock-up condition directly from the direct-drive condition as the overdrive ratio is eliminated.

If the transmission manual valve is in either the D–4 position or the D–3 position, passage 436 is pressurized as indicated in FIGURE 4C. This passage extends to the downshift valve 438 which has a pair of valve lands 440 and 442. Normally, the passage 436 is blocked as the land 440 is urged in a left-hand direction by valve spring 444. At that time passage 446 communicates with passage 448 through the valve 438. Passage 448 is exhausted when the transmission is either in high or in overdrive. The downshift valve 438 is connected mechanically to the engine carburetor throttle. When the engine carburetor throttle is advanced, it advances the wide open setting, valve 438 is shifted so that land 442 blocks passage 448 and land 440 uncovers passage 436 to establish communication between passage 436 and passage 446. A downshift pressure signal then will be distributed to the lower end of the 2–3 shift valve and to the differential area on the 1–2 shift valve established by the lands 450 and 452. A downshift pressure signal is distributed also from passage 446 to passage 454 which communicates with the lower end of the 3–4 shift valve 202 and to the differential area 302 on the third-to-lock-up shift valve 204. Passage 454 communicates wtih the valve 204 through the valve 354 and through passage 456 and then through passage 332 and passage 304.

The throttle pressure signal in passage 318 is developed by a throttle booster valve 458 and primary throttle valve 460. Valve 458 comprises valve element 462 having spaced valve lands 464 and 466, the diameter of land 466 being greater than the diameter of land 464. Valve spring 468 urges the valve element 462 in a right-hand direction to oppose the output pressure signal of the primary throttle valve 460 which is distributed to the valve 458 through passage 470. Control pressure is distributed directly to the valve 454 through passage 472 from the main control line 228. After the magnitude of the signal in passage 470 reaches a predetermined value, valve spool 462 will be shifted against the force of spring 468 thereby progressively increasing the degree of communication between passage 472 and passage 318 while progressively decreasing the communication between passage 470 and passage 318. This causes an application of the signal in passage 318 relative to the magnitude of the signal of passage 470.

By appropirately calibrating the throttle booster valve 458, the desired shift points can be established so that they correspond to the torque demand requirements. This relates the shift points directly to the torque demand rather than to the magnitude of the engine intake manifold pressure.

Valve 460 comprises a valve element 474 having lands 476 and 478. Control pressure is distributed to the valve 460 through passage 228. An exhaust port 480 is situated adjacent the output signal pressure passage 482, which communicates with the throttle booster valve 458. Passage 482 communicates also with the left-hand side of the valve land 476. An engine intake manifold pressure operated servo actuates the valve element 474. Upon an increase in the magnitude of the pressure in the engine intake manifold, the force acting on the valve element 474 in a left-hand direction increases. This results in an increase in the modulated pressure signal in passage 482.

Having thus described a preferred form of my invention, what I claim and desire to secure by U.S. Letters Patent is:

1. In a control valve system for an automatic power transmission mechanism having a hydrokinetic torque transmitting unit with a turbine and impeller situated in a toroidal fluid-flow cavity, a driven member, multiple ratio gear elements, an overdrive gear unit, said gear elements having a power output portion which is connected directly to power input portions of said overdrive gear unit, power output portions of said overdrive gear unit being connected to said driven member, clutch means and brake means for controlling the relative motion of said gear elements to establish various speed ratios therein, fluid pressure operated servos for controlling the application and release of said clutch and brake means, said clutch means establishing a driving connection between said turbine and power input portions of said gear elements, an overdrive fluid pressure operated brake means for anchoring a reaction element of said overdrive gear unit to establish an overdrive ratio therein, a fluid pressure source, conduit structure including a first portion connecting said pressure source and said servos and a second portion connecting said pressure source and said overdrive brake means, a source of a pressure signal that is proportional in magnitude to the speed of said driven member, a source of a pressure signal that is proportional in magnitude to engine torque delivery requirements, shift valve means situated in and partly defining said first conduit structure portion for controlling selectively the distribution of pressure from said source to said servos to initiate speed ratio changes, said shift valve means being in fluid communication with said pressure signal sources, an overdrive shift valve in said second conduit structure portion and partly defining the same, manual valve means for distributing pressure from said pressure source to said overdrive shift valve when said manual valve assumes an overdrive position, said overdrive shift valve being in fluid communication with said pressure signal sources, and overdrive control valve means in fluid communication with said overdrive brake means and with high pressure regions of said control system whereby it is effective to selectively exhaust and pressurize said overdrive brake means, said overdrive shift valve and said overdrive control valve being in fluid communication whereby a pressure signal from the former is distributed to the latter to actuate the latter in response to changes in said pressure signals.

2. In a control valve system for an automatic power transmission mechanism having a hydrokinetic torque transmitting unit with a turbine and impeller situated in a toroidal fluid flow cavity, a driven member, multiple ratio gear elements, an overdrive gear unit, said gear elements having a power output portion which is connected directly to power input portions of said overdrive gear unit, power output portions of said overdrive gear unit being connected to said driven member, clutch means and brake means for controlling the relative motion of said gear elements to establish various speed ratios therein, fluid pressure operated servos for controlling the application and release of said clutch means and brake means, said clutch means establishing a driving connection between said turbine and power input portions of said gear elements, an overdrive fluid pressure operated brake means for anchoring a reaction element of said overdrive gear unit to establish an overdrive ratio therein, a fluid pressure source, conduit structure including a first portion connecting said pressure source and said servos and a second portion connecting said pressure source and said overdrive brake means, a source of a pressure signal that is proportional in magnitude to the speed of said driven member, a source of a pressure signal that is proportional in magnitude to engine torque delivery requirements, shift valve means situated in and partly defining said first named conduit structure portion for controlling selectively the distribution of pressure from said source to said servos to initiate speed ratio changes, said shift valve means being in fluid communication with said pressure signal sources, an overdrive shift valve in said second conduit structure portion and partly defining the same, manual valve means for distributing pressure from said pressure source to said overdrive shift valve when said manual valve assumes an overdrive position, said overdrive shift valve being in fluid communication with said pressure signal sources, and overdrive control valve means in fluid communication with said overdrive servo and with high pressure regions of said control system whereby for selectively exhausting and pressurizing said overdrive brake means, said overdrive shift valve and said overdrive control valve being in fluid communication whereby a pressure signal from the former is distributed to the latter to actuate the latter in response to changes in said pressure signals, a lock-up clutch in said converter including a first clutch member connected to said turbine and a second clutch member connected to said impeller, the circuit pressure in said torus cavity urging said clutch members into frictional engagement, a first torus cavity flow passage adapted to deliver fluid to said torus cavity as torus cavity pressure develops, a second torus flow passage communicating with said cavity at a location between said clutch elements, a hydrokinetic unit supply passage, and a hydrokinetic unit valve in said supply passage communicating with said torus flow passages and adapted to distribute selectively fluid from said supply passage to said torus flow passages whereby one torus flow passage is pressurized as the other is brought into communication with a low presusre region, said hydrokinetic unit control valve and said overdrive shift valve being in fluid communication whereby the latter supples the former with a pressure signal as it is shifted from one speed ratio position to another.

3. In a control valve system for an automatic power transmission mechanism having a hydrokinetic torque transmitting unit with a turbine and impeller situated in a toroidal fluid flow cavity, a driven member, multiple ratio gear elements, an overdrive gear unit, said gear elements having a power output portion which is connected directly to power input portions of said overdrive gear unit, power output portions of said overdrive gear unit being connected to said driven member, clutch means and brake means for controlling the relative motion of said gear elements to establish various speed ratios therein, fluid pressure operated servos for controlling the application and release of said clutch means and brake means, said clutch means establishing a driving connection between said turbine and power input portions of said gear elements, an overdrive fluid pressure operated brake means for anchoring a reaction element of said overdrive gear unit to establish an overdrive ratio therein, a fluid pressure source, conduit structure including a first portion connecting said pressure source and said servos and a second portion connecting said pressure source and said overdrive brake means, a source of a pressure signal that is proportional in magnitude to the speed of said driven member, a source of a pressure signal that is proportional in magnitude to engine torque delivery requirements, shift valve means situated in and partly defining said first named conduit structure portion for controlling selectively the distribution of pressure from said source to said servos to initiate speed ratio changes, said shift valve means being in fluid communication with said pressure signal sources, an overdrive shift valve in said second conduit structure portion and partly defining the same, manual valve means for distributing pressure from said pressure source to said overdrive shift valve when said manual valve assumes an overdrive position, said overdrive shift valve being in fluid communication with said pressure signal sources, and overdrive control valve means in fluid communication with said overdrive servo and with high pressure regions of said control system whereby for selectively exhausting and pressurizing said overdrive brake means, said overdrive shift valve and said overdrive control valve being in fluid communication whereby a pressure signal from the former is distributed to the latter to actuate the latter in response to changes in said pressure signals, a lock-up clutch in said converter including a first clutch member connected to said turbine and a second clutch member connected to said impeller, the circuit pressure in said torus cavity urging said clutch members into frictional engagement, a first torus cavity flow passage adapted to deliver fluid to said torus cavity as torus cavity pressure develops, a second torus flow passage communicating with said cavity at a location between said clutch elements, a hydrokinetic unit supply passage, and a hydrokinetic unit valve in said supply passage communicating with and torus flow passages and adapted to distribute selectively fluid from said supply passage to said torus flow passages whereby one torus flow passage is pressurized as the other is brought into communication with a low pressure region, said hydrokinetic unit control valve and said overdrive shift valve being in fluid communication whereby the latter supplies the former with a pressure signal as it is shifted from one speed ratio position to another, a high-to-lockup shift valve in fluid communication with said shift valve means whereby the former is supplied with pressure as said shift valve means assume a high speed ratio condition, a connection between said high-to-lockup shift valve and said hydrokinetic unit control valve whereby the latter is shifted to a lockup condition when the former is shifted to an upshift condition, said high-to-lockup shift valve being in fluid communication with said pressure signal whereby it is shifted between an upshift condition and a downshift condition thereby selectively pressurizing said hydrokinetic unit control valve to effect ratio changes between the high speed ratio and the lockup condition.

4. The combination as set forth in claim 2 wherein the manual valve means connecting said pressure source with said overdrive shift valve is in communication also with said high-to-lockup shift valve whereby an inhibiting pressure force is applied to said high-to-lockup shift valve whenever pressure is supplied from said manual valve to said overdrive shift valve thereby preventing automatic functioning of said direct-to-lockup shift valve when said overdrive shift valve is operative.

5. The combination as set forth in claim 3 wherein the manual valve means connecting said pressure source with said overdrive shift valve is in communication also with said high-to-lockup shift valve whereby an inhibiting pressure force is applied to said high-to-lockup shift valve whenever pressure is supplied from said manual valve to said overdrive shift valve thereby preventing automatic functioning of said direct-to-lockup shift valve when said overdrive shift valve is operative.

6. The combination as set forth in claim 2 wherein the connection between said pressure source and said overdrive shift valve is in communication also with said overdrive control valve whereby the latter is shifted to its overdrive position following upshifting movement of said overdrive shift valve before the pressure signal distributed by the latter to said hydrokinetic unit control valve develops sufficiently to establish a lockup position.

7. The combination as set forth in claim 3 wherein the connection between said pressure source and said overdrive shift valve is in communication also with said overdrive control valve whereby the latter is shifted to its overdrive position following upshifting movement of said overdrive shift valve before the pressure signal distributed by the latter to said hydrokinetic unit control valve develops sufficiently to establish a lockup position.

8. The combination as set forth in claim 4 wherein the connection between said pressure source and said overdrive shift valve is in communication also with said overdrive control valve whereby the latter is shifted to its overdrive position following upshifting movement of said overdrive shift valve before the pressure signal distributed by the latter to said hydrokinetic unit control valve develops sufficiently to establish a lockup position.

9. The combination as set forth in claim 5 wherein the connection between said pressure source and said overdrive shift valve is in communication also with said overdrive control valve whereby the latter is shifted to its overdrive position following upshifting movement of said overdrive shift valve before the pressure signal distributed by the latter to said hydrokinetic unit control valve develops sufficiently to establish a lockup position.

10. The combination as set forth in claim 6 wherein said overdrive control valve comprises a movable valve element, one end of which is continuously pressurized when said manual valve is moved to its overdrive position, the other end of said overdrive control valve being in fluid communication with said overdrive shift valve, the latter having an exhaust port, said overdrive shift valve upon shifting movement to its upshift position establishing communication between the other end of said overdrive control valve and said exhaust port whereby said overdrive control valve shifts to an overdrive position as control pressure is distributed directly to said overdrive brake means.

11. The combination as set forth in claim 7 wherein said overdrive control valve comprises a movable valve element, one end of which is continuously pressurized when said manual valve is moved to its overdrive position, the other end of said overdrive control valve being in fluid communication with said overdrive shift valve, the latter having an exhaust port, said overdrive shift valve upon shifting movement to its upshift position establishing communication between the other end of said overdrive control valve and said exhaust port whereby said overdrive control valve shifts to an overdrive position as control pressure is distributed directly to said overdrive brake means.

12. The combination as set forth in claim 8 wherein said overdrive control valve comprises a movable valve element, one end of which is continuously pressurized when said manual valve is moved to its overdrive position, the other end of said overdrive control valve being in fluid communication with said overdrive shift valve, the latter having an exhaust port, said overdrive shift valve upon shifting movement to its upshift position establishing communication between the other end of said overdrive control valve and said exhaust port whereby said overdrive control valve shifts to an overdrive position as control pressure is distributed directly to said overdrive brake means.

13. The combination as set forth in claim 9 wherein said overdrive control valve comprises a movable valve element, one end of which is continuously pressurized when said manual valve is moved to its overdrive position, the other end of said overdrive control valve being in fluid communication with said overdrive shift valve, the latter having an exhaust port, said overdrive shift valve upon shifting movement to its upshift position establishing communication between the other end of said overdrive control valve and said exhaust port whereby said overdrive control valve shifts to an overdrive position as control pressure is distributed directly to said overdrive brake means.

References Cited

UNITED STATES PATENTS

| | | | |
|---|---|---|---|
| 3,159,051 | 12/1964 | Herndon et al. | 74—869 X |
| 3,239,037 | 3/1966 | Croswhite et al. | 192—3.3 |

DONLEY J. STOCKING, Primary Examiner

T. C. PERRY, Assistant Examiner

U.S. Cl. X.R.

74—869; 192—.092, 3.3